Jan. 11, 1949.   C. WILLIAMS   2,458,667

TRAILER HITCH

Filed Sept. 25, 1946

INVENTOR.
CHESTER WILLIAMS

BY Edward M. Apple
ATTORNEY

Patented Jan. 11, 1949

2,458,667

UNITED STATES PATENT OFFICE 2,458,667

TRAILER HITCH

Chester Williams, Ypsilanti, Mich.

Application September 25, 1946, Serial No. 699,249

9 Claims. (Cl. 280—33.44)

This invention relates to automobile trailer hitches, and has particular reference to a device of the character indicated which is adapted to fit on the bumper of practically any type of automobile.

An object of the invention is to generally improve trailer hitches, and to provide a device which is simple in construction, economical to manufacture, easy to attach and detach, and efficient in operation.

Another object of the invention is the provision of a bumper type trailer hitch which is constructed and arranged so that the ball support for the trailer tow bar is always maintained in a vertical position, regardless of the contour or angle of the bumper to which the device is secured.

Another object of the invention is the provision of a device of the character indicated, which may be applied to the bumper of any automobile without danger of damaging the gravel shield or any other part of the vehicle.

The foregoing and other objects and advantages of the invention will become more apparent as the description proceeds, reference being made from time to time to the accompanying drawings, forming part of the within disclosure, in which drawings.

Figure 1:
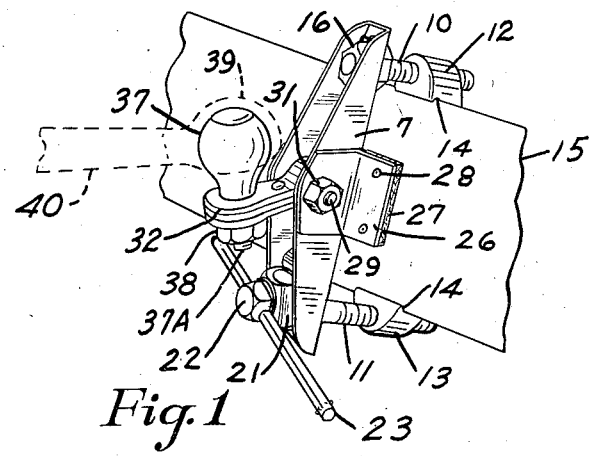
Fig. 1 is a perspective view of a device embodying the invention shown in position on the bumper of a conventional automobile.
Figures 2, 3:
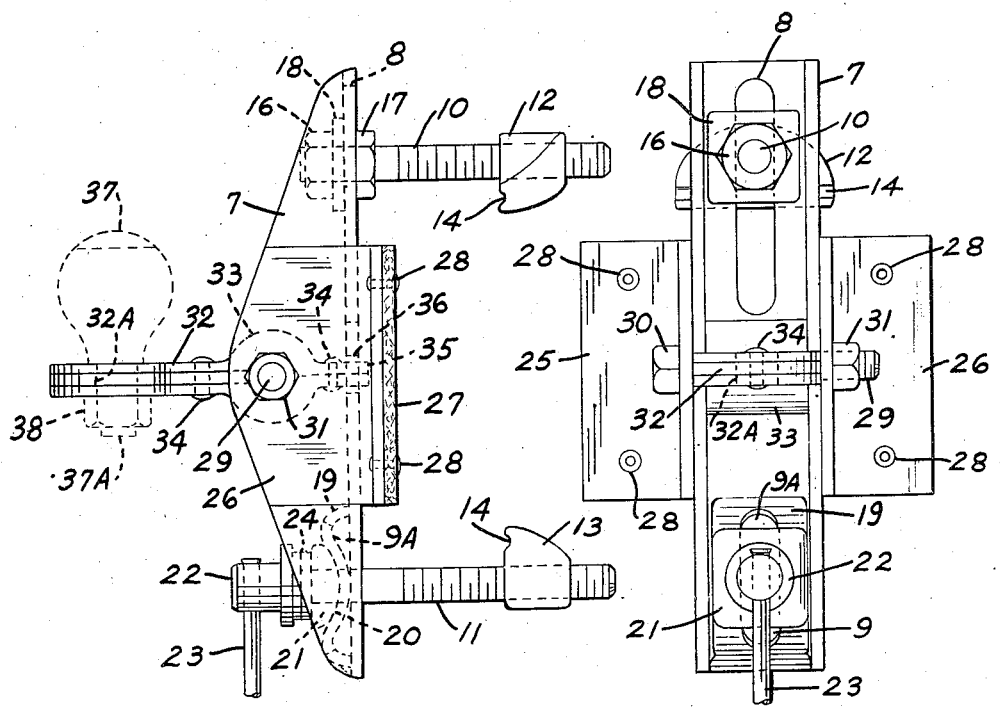
Fig. 2 is an enlarged side elevational view of the device shown in Fig. 1.
Fig. 3 is a front elevational view of the device illustrated in Fig. 2.

Referring now more particularly to the drawings, it will be understood that in the embodiment herein disclosed, the reference character 7 indicates a channel shaped casting which is provided with longitudinally positioned slots 8 and 9 which are adapted to accommodate the attaching bolts 10 and 11, each of which is provided with an internally threaded lug 12 and 13, the latter having transverse grooves 14 formed therein, which grooves are adapted to engage the opposite edges of an automobile bumper 15 (Fig. 1).

The bolt 10 is secured in any desired position in the slot 8 by means of nuts 16 and 17 between which is positioned a washer 18. The slots 8 and 9 are provided so that the bolts 10 and 11 may be adjusted on the casting 7 to accommodate any width of bumper.

Secured by welding or other suitable means on the inside near one end of the casting 7 and having a slot 9A in alignment with the slot 9, is a saddle member 19 which has an inwardly curved central portion 20 adapted to accommodate a rocker member 21 which is centrally bored to accommodate the bolt 11, so that the bolt 11 may be rocked into angular position with reference to the longitudinal axis of the casting 7. This structure is provided so that the lug 13 may be made to fit any type of bumper having either straight or curved cross sections. The bolt 11 is provided with a terminal member 22 through which is slidably extended a bar 23, whereby the bolt 11 may be rotated to effect a clamping action between the lug 13 and the casting 7. Washers 24 are provided between the terminal member 22 and the rocker member 21.

Secured to opposite sides of the casting 7 by welding or other suitable means, are L shaped angle plates 25 and 26 which serve to absorb the thrust placed on the hitch in operation. Resilient pads 27 are secured to the underside of the L shaped members 25 and 26 by means of rivets 28 or other suitable means so that the bumper will not be scratched or damaged.

Extending transversely through the vertical legs of the angle plates 25 and 26, and through the sides of the casting 7, is a bolt 29 having a head 30 and a nut 31. The bolt 29 is adapted to support a bearing plate 32 which is provided with an enlarged hub portion 33, the ends of which may be impinged between the side walls of the casting 7. The bearing plate 32 preferably consists of two or more individual plates secured together by means of rivets 34 or other suitable means.

The bearing plate 32 has a rearwardly extending portion 35 which is adapted to extend through a centrally positioned slot 36 formed in the bottom of the casting 7. This permits the member 32 to be slightly pivoted on the bolt 29 to effect adjustment of the member 32 so that the ball bearing member 37 may always be maintained in a vertical position. It will be understood that the ball bearing member 37 has a shank 37A which extends through a suitable bore 32A in the plate 32, and is secured thereto by means of the nut 38. The ball bearing member 37 is adapted to accommodate the socket 39 (Fig. 1) formed on the end of the trailer tow bar 40.

From the foregoing it is obvious that my improved device may readily be attached to any automobile bumper regardless of its cross sectional contour, and may be adjusted so that the ball 37 always remains in a vertical position.

Having described my invention, what I claim and desire to secure by Letters Patent is:

1. In a device of the character described, the combination of a channel member having slots therein adapted to accommodate attaching bolts, attaching bolts in said slots, said bolts having lugs thereon adapted to engage opposite sides of an automobile bumper, a bearing plate pivotally secured to said channel member, and thrust plates on opposite sides of said channel member, the pivot of said bearing plate extending through the said thrust plates.

2. In a device of the character described, the combination of a channel member having slots therein adapted to accommodate attaching bolts, attaching bolts in said slots, said bolts having lugs thereon adapted to engage opposite sides of an automobile bumper, a bearing plate pivotally secured to said channel member, and a slotted arcuate member in alignment with one of the slots of said channel member, said arcuate member being adapted to cooperate with a rocker carried by one of said attaching bolts.

3. In a device of the character described, the combination of a channel member having slots therein adapted to accommodate attaching bolts, attaching bolts in said slots, said bolts having lugs thereon adapted to engage opposite sides of an automobile bumper, a bearing plate pivotally secured to said channel member, and said bearing plate being provided with a rearwardly extending member adapted to cooperate with a slot formed in said channel member.

4. The combination defined in claim 2 and a bearing plate which is provided with an extension member adapted to engage a slot formed in the bottom of said channel member.

5. The combination defined in claim 2, in which said bearing member is provided with an enlarged hub portion adapted to be impinged between the side walls of said channel member.

6. In a device of the character described, the combination of a channel member, slots in said channel member adapted to accommodate attaching bolts, attaching bolts in said slots, threaded lugs carried by said attaching bolts, a bearing plate pivotally mounted between the sides of said channel member, a curved saddle member mounted adjacent one of said slots and having a slot in alignment with said last named slot, and a rocker cooperating between said saddle member and one of said bolts.

7. The combination defined in claim 6, including thrust plates positioned on opposite sides of said channel member.

8. The combination defined in claim 6, in which said bearing plate has a hub portion adapted to be impinged between the side walls of said channel member and an extension member adapted to engage a slot in the bottom of said channel member.

9. The combination defined in claim 6 in which the attaching bolt adjacent the curved saddle member is provided with a terminal member having a slidable pin therethrough.

CHESTER WILLIAMS.

REFERENCES CITED

The following references are of record in the file of this patent:

UNITED STATES PATENTS

| Number | Name | Date |
|---|---|---|
| 2,106,130 | Campbell | Jan. 18, 1938 |
| 2,306,007 | Thorp | Dec. 22, 1942 |
| 2,306,388 | Johnson et al. | Dec. 29, 1942 |
| 2,417,338 | Williams | Mar. 11, 1947 |